(12) United States Patent
Aoyama et al.

(10) Patent No.: US 7,132,002 B2
(45) Date of Patent: Nov. 7, 2006

(54) HYDROGEN GENERATING DEVICE HAVING HYDROGEN SEPARATOR MEMBRANE AND CONTROL METHOD THEREFOR

(75) Inventors: Satoshi Aoyama, Susono (JP); Hiromichi Sato, Atsugi (JP); Toshihide Nakata, Sapporo (JP); Naoki Ito, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 515 days.

(21) Appl. No.: 10/243,918

(22) Filed: Sep. 16, 2002

(65) Prior Publication Data

US 2003/0056440 A1    Mar. 27, 2003

(30) Foreign Application Priority Data

Sep. 21, 2001  (JP) .............................. 2001-288040

(51) Int. Cl.
*B01J 8/00*    (2006.01)
(52) U.S. Cl. ..................................... 48/127.9; 428/108
(58) Field of Classification Search ............ 96/4, 96/11; 48/198.2, 127.9, 61; 422/194, 198
See application file for complete search history.

(56) References Cited

U.S. PATENT DOCUMENTS 6,383,670 B1 * 5/2002 Edlund et al. ................ 429/20
6,656,617 B1 * 12/2003 Aoyama et al. .............. 429/19
6,851,947 B1 * 2/2005 Sugimoto et al. ............. 431/7

FOREIGN PATENT DOCUMENTS

| EP | 0 924 161 A2 | 6/1999 |
| EP | 0 924 162 A2 | 6/1999 |
| EP | 0 924 163 A2 | 6/1999 |
| JP | B2 2955054 | 7/1999 |
| WO | WO 99/65097 | * 12/1999 |
| WO | WO 99 65097 A1 | 12/1999 |

* cited by examiner

*Primary Examiner*—Glen Caldarola
*Assistant Examiner*—Tom P. Duong
(74) *Attorney, Agent, or Firm*—Oliff & Berridge PLC

(57) ABSTRACT

When the hydrogen separating membrane is in a low temperature condition, a lean bus operation is carried out in a reformer in order to conduct warm-up while suppressing generation of hydrogen. At the timing t1 where the temperature of the hydrogen separator membrane has reached a temperature at which hydrogen embrittlement does not occur, reforming is initiated. In such a condition, oxygen is supplied to hydrogen which is permeated through the hydrogen separator membrane for burning the hydrogen, so as to further facilitate the warm-up. At the timing t2 where the temperature has reached an operation temperature, the supply of oxygen in a purge side is stopped so as to stop the burning of hydrogen, and an operation mode is shifted to a normal operation.

14 Claims, 7 Drawing Sheets

HYDROGEN GENERATING DEVICE HAVING HYDROGEN SEPARATOR MEMBRANE AND CONTROL METHOD THEREFOR

INCORPORATION BY REFERENCE

The disclosure of Japanese Patent Application No. 2001-288040 filed on Sep. 21, 2001 including the specification, drawings, and abstract is incorporated herein by reference in its entirety.

BACKGROUND OF THE INVENTION

1. Field of the Invention

The invention relates to a hydrogen generating device and a control method therefor for generating a hydrogen-rich gas by separating hydrogen from a reformed gas, which is obtained by reforming a predetermined raw material, using a hydrogen separator membrane.

2. Description of the Related Art

A fuel cell, which generates electric power by electro-chemical reaction between hydrogen and oxygen, has recently been gaining attention as an energy source. The fuel cell generates an electromotive force by the electro-chemical reaction between hydrogen and oxygen. The hydrogen to be supplied to the fiel cell is generated by a hydrogen generating device by reforming a raw material, such as hydrocarbon system and the like. In order to improve the purity of hydrogen in the reforms gas obtained by reforming the raw material, a hydrogen separator membrane may be used. The hydrogen separator membrane is a membrane having a permeable property for selectively permeating the hydrogen, and a thin film of palladium or palladium alloy is adopted as such hydrogen separator membrane. When the reformed gas is supplied to one surface of the hydrogen separator membrane, the hydrogen is extracted from the other surface based on a difference of a hydrogen partial pressure, thereby improving the hydrogen purity.

The hydrogen separator membrane has a tendency of becoming fragile or brittle (hydrogen embrittlement) by absorbing hydrogen in a low temperature condition where a proper operation temperature level is not reached. In a conventional hydrogen generating device, such hydrogen embrittlement phenomenon had not been considered. Accordingly, there has been a possibility that the hydrogen embrittlement may occur with the hydrogen separator membrane upon starting operation at which the temperature of the hydrogen generating device is in a relatively low temperature condition. The hydrogen embrittlement may cause cracks or damages on the hydrogen separator membrane.

Further, conventionally when the operation of the hydrogen generating device is initiated in a low temperature condition such as at the time of starting, during a so-called warm-up operation, an uneven temperature rise has occurred within the device and no little thermal stress has been generated in the device. Accordingly, if the hydrogen separator membrane is in a hydrogen-embrittled state, there has been a possibility that such thermal stress may cause cracks or damages on the membrane.

SUMMARY OF THE INVENTION

The invention has been made to solve the aforementioned problems, and it is an object of the invention to suppress hydrogen enbrittlement in the case where the hydrogen generating device is in a low temperature condition. It is a further object of the invention to suppress a thermal stress during the warm-up operation of the hydrogen generating device and to reduce a possibility of generation of cracks and damages on the hydrogen separator membrane.

In order to achieve the foregoing objects, according to one aspect of the invention, a hydrogen generating device for generating a hydrogen-rich gas by reforming a raw material includes a reforming portion for generating a reformed gas by reforming the raw material, a supply portion for supplying a material required for reforming to the reforming portion, a hydrogen separator membrane for selectively permeating hydrogen, a hydrogen separating portion having a reformed gas flow passage and a hydrogen flow passage arranged such that the hydrogen separator membrane is sandwiched therebetween, the hydrogen separating portion separating hydrogen towards the hydrogen flow passage side from the reformed gas which is supplied to the reformed gas flow passage from the reforming portion, and a hydrogen suppressing portion for suppressing the concentration of hydrogen in the reformed gas supplied to the reformed gas flow passage when the temperature of the hydrogen separating portion is lower than a predetermined temperature determined based on a material of the hydrogen separator membrane.

According to the hydrogen generating device as structured above, hydrogen embrittlement of the hydrogen separator membrane in a low temperature condition can be suppressed. The "low temperature condition" refers to a condition in which a temperature of the hydrogen separating portion is lower than a predetermined temperature which is determined based on the material of the hydrogen separator membrane. Such a condition includes the starting of the device. The hydrogen suppressing portion can be structured so as to control the supply portion to cause an oxidation reaction by a lean burn operation in the reforming portion in the low temperature condition. In a condition where a large amount of oxygen exists, such as in a lean burn condition, partial oxidation will not occur. Most of the raw material is vaporized or becomes carbon dioxide by full oxidation or oxidation by burner, in other words, by burning. According to such control, generation of hydrogen is suppressed and adsorption of hydrogen to the hydrogen separator membrane will not occur, thereby avoiding the hydrogen embrittlement of the hydrogen separator membrane. Further, in this reaction, since a high temperature gas is generated, warm-up of the hydrogen generating device can be facilitated by supplying such high temperature gas.

By supplying a large amount of oxygen to the reforming portion, the following effects can also be obtained in accordance with the amount of oxygen supplied. First, carbon attached to the hydrogen separator membrane can be oxidized by the high temperature oxygen, and thereby the hydrogen separator membrane can be purified. Second, by supplying excessive oxygen or air for oxidation reaction, the heat generated during the reaction can be diluted. Accordingly, a temperature of the gas generated by the reaction can be substantially adjusted to the operation temperature of the reforming portion, and thus deterioration of catalyst caused by overheating during warm-up operation can be reduced. A sudden temperature rise of the hydrogen generating device can be avoided, and therefore generation of the thermal stress can also be reduced.

DETAILED DESCRIPTION OF THE PREFERRED EMBODIMENTS

Figure 1:
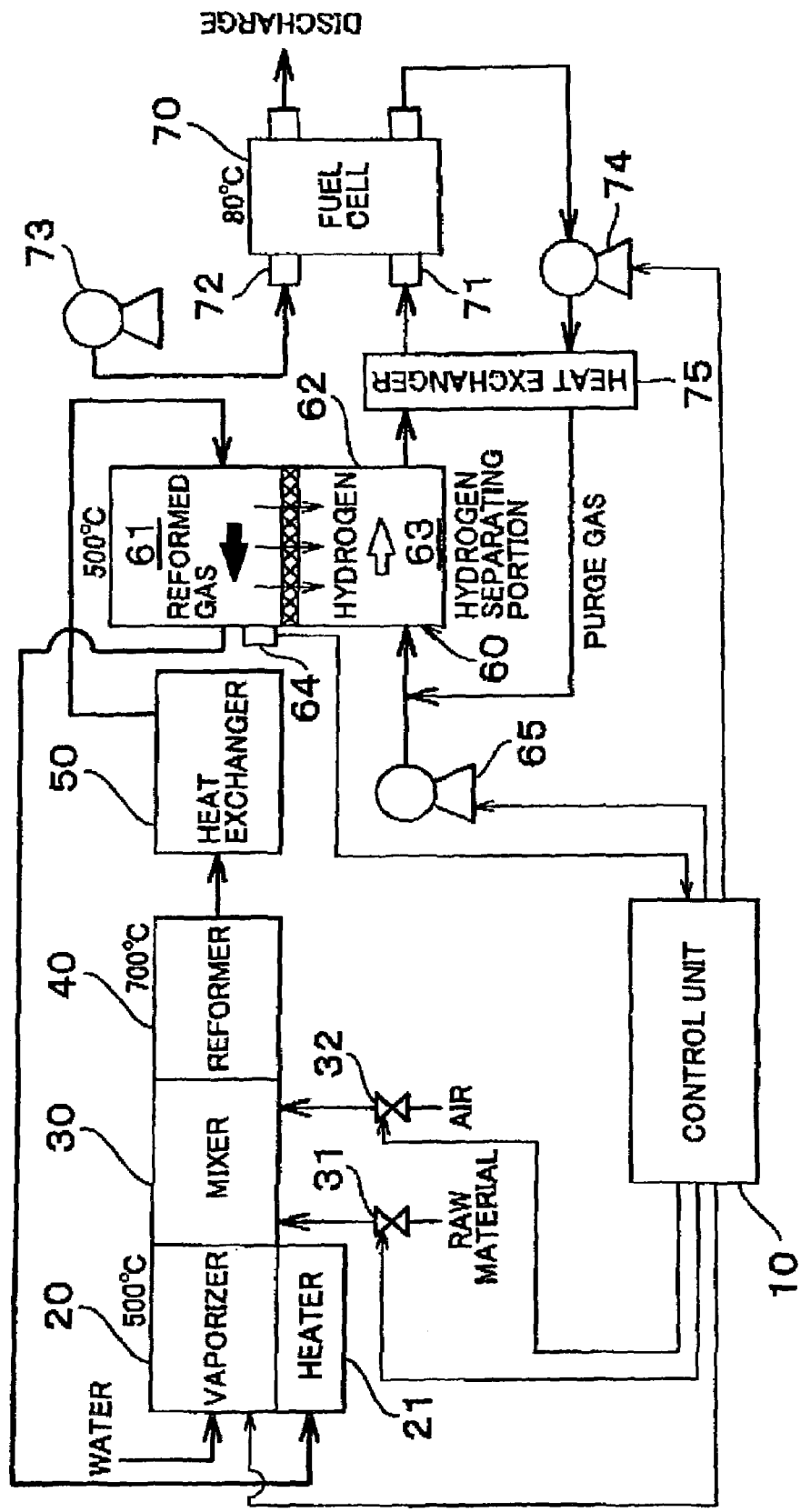
FIG. 1 is an explanatory view of a general structure of a fuel cell system according to a first embodiment.

The implementation of the embodiments of the invention will be described based on the following order:
A. FIRST EMBODIMENT
A1. SYSTEM STRUCTURE
A2. STARTING CONTROL PROCESS
A3. MODIFIED EXAMPLE
B. SECOND EMBODIMENT
B1. SYSTEM STRUCTURE
B2. STARTING CONTROL PROCESS A. First Embodiment A1. System Structure FIG. 1 is an explanatory view of a general structure of a fuel cell system according to a first embodiment The fuel cell system generates electric power by electrochemical reaction between hydrogen and oxygen supplied to a fuel cell 70. Compressed air supplied to a cathode 72 by blower 73 is used as oxygen to be supplied. Hydrogen is generated by reforming a raw material by a hydrogen generating device which will be explained below, and is supplied to an anode 71. The raw material to be used can be selected from various carbon hydrogen fuels, which can generate hydrogen by reforming reaction, for example, liquid carbon hydrogen such as gasoline, alcohol such as methanol, aldehyde, or natural gas.

The raw material and water (not shown) are respectively stored in a tank which serves as a supply portion. The water is first vaporized and heated to about 500° C. in a vaporizer 20, and then supplied to a mixer 30. The raw material and air are separately supplied to the mixer 30 from the supply portion. The raw material and air may be supplied after being heated by a heat exchanger 50 and the like. The vapor, raw material, and air are supplied to a reformer 40 after being mixed in the mixer 30. The supply amount of each is controlled by the operation of the vaporizer 20 and an opening degree control of valves 31 and 32.

A mixed gas of raw material, water, and air is reformed in the reformer 40 which serves as the reforming portion, thereby generating hydrogen-rich reformed gas. In the reformer 40, a vapor reforming reaction and a partial oxidation reaction are carried out simultaneously under the ambient temperature of about 700° C. during normal operation. The partial oxidation reaction refers to an exothermic reaction, which generates hydrogen by the raw material and oxygen. The vapor reforming reaction refers to an endothermic reaction, which generates hydrogen from the raw material and vapor. The reformer 40 is provided with a reforming catalyst, which is suitable for these reactions, in accordance with the type of the raw material. In either reaction, both carbon dioxide and carbon monoxide are generated, and accordingly the reformed gas obtained will be a mixture thereof. The reformer 40 may be used to burn raw material or carry out a complete oxidation reaction. Under the aforementioned reactions, carbon dioxide and vapor are generated due to oxidation of the raw material, while hydrogen is hardly generated. However, these reactions generates a large amount of heat, and thus are useful for facilitating the warm-up operation.

Since the reformed gas includes carbon monoxide, a shifting portion for generating hydrogen from carbon monoxide and vapor, and a CO purifying portion for selectively oxidizing carbon monoxide may be provided at the downstream of the reformer 40. When the gasoline is used as the raw material it is preferable to provide the shifting portion.

The reformed gas is supplied to a reformed gas flow passage 61 of a hydrogen separating portion 60 after being cooled to about 500° C. in the heat exchanger 50. The hydrogen separating portion 60 is structured such that the reformed gas flow passage 61 and a hydrogen flow passage 63 are arranged so as to sandwich a hydrogen separator membrane 62 which selectively permeates hydrogen. Various materials may be used for the hydrogen separator membrane 62. For example, a thin film of palladium or palladium alloy may be used. As shown in the drawing, the hydrogen in the reformed gas supplied to the reformed gas flow passage 61 permeates through the hydrogen separator membrane 62 in accordance with a difference in the hydrogen partial pressure with respect to the hydrogen flow passage 63, and is separated towards the side of the hydrogen flow passage 63. In this embodiment, a non-permeated gas after hydrogen separation is used as a fuel for a beater 21 for beating the vaporizer 20. Nevertheless, such non-permeated gas may simply be discharged.

The hydrogen separating portion 60 has the following structure to improve a hydrogen separation efficiency:

First, a purge gas is supplied to the hydrogen flow passage 63 for delivering the separated hydrogen. For the pre gas, various gases such as nitrogen or vapor that will not disrupt the operation of the fuel cell 70 and will not react with hydrogen can be used. In this embodiment, nitrogen is used for the purge gas. Nitrogen is sealed in a circulation passage for purge gas in advance. The hydrogen partial pressure in the hydrogen flow passage 63 is reduced by supplying the purge gas, and thus the hydrogen separation efficiency is improved. However, the system structure may do without such purge gas supply.

Secondly, the hydrogen flow passage 63 and the reformed gas flow passage 61 are arranged such that the directions of their flows are opposite from each other. This will create a relatively large difference in the hydrogen partial pressure between the hydrogen flow passage 63 and the reformed gas flow passage 61, and thereby the hydrogen separation efficiency can be improved. However, the flow passages need not necessarily be structured such that the lions of their flows are opposite from each other.

The hydrogen extracted and supplied to the hydrogen flow passage 63 is supplied, together with the purge gas, to a heat exchanger 75 where they are cooled to about 80° C., and then supplied to the anode 71. An anode off-gas discharged from the anode 71 is returned to the hydrogen flow passage 63 through the heat exchanger 75 by operation of a pump 74. It is possible to introduce air into the circulation passage for purge gas from outside by operating a pump 65. The heat exchanger 75 carries a platinum catalyst as an oxidation catalyst so as to burn the hydrogen in a certain condition, which will be explained below. A relief valve (not shown) is provided in the circulation passage to avoid an excessive increase in the pressure. Further, the non-permeated gas discharged from the hydrogen separating portion 60 may be supplied to the circulation passage for purge gas in order to facilitate the warm-up operation.

Operation of the fuel cell system is controlled by a control unit 10. The control unit 10 is formed of a microcomputer having CPU and memories therein. In order to simplify the drawing, only the input/output to/from the control unit 10 associated with a starting control process, which will be explained below, are illustrated. Signals for controlling the operation of vaporizer 20 and the opening degree of valves 31 and 32 are output from the control unit 10. The amount of raw material, water, and air supplied to the reformer 40 is controlled by these control signals. The supply amount of air may be considered as the amount of oxygen utilized for oxidation reaction. Further, the control unit 10 outputs the control signals for controlling the operation of the pumps 74 and 65 provided in the circulation passage for purge gas. In order to achieve these controls, a detected value of a temperature sensor 64 which detects the inside temperature of the hydrogen separating portion 60 is input to the control unit 10.

The control unit 10 executes various controls for the operation of the fuel cell system, including an output control during normal operation. Among such controls, the starting control process, which is characteristic of this embodiment, will be explained hereinafter.

A2. Starting Control Process

Figure 2:
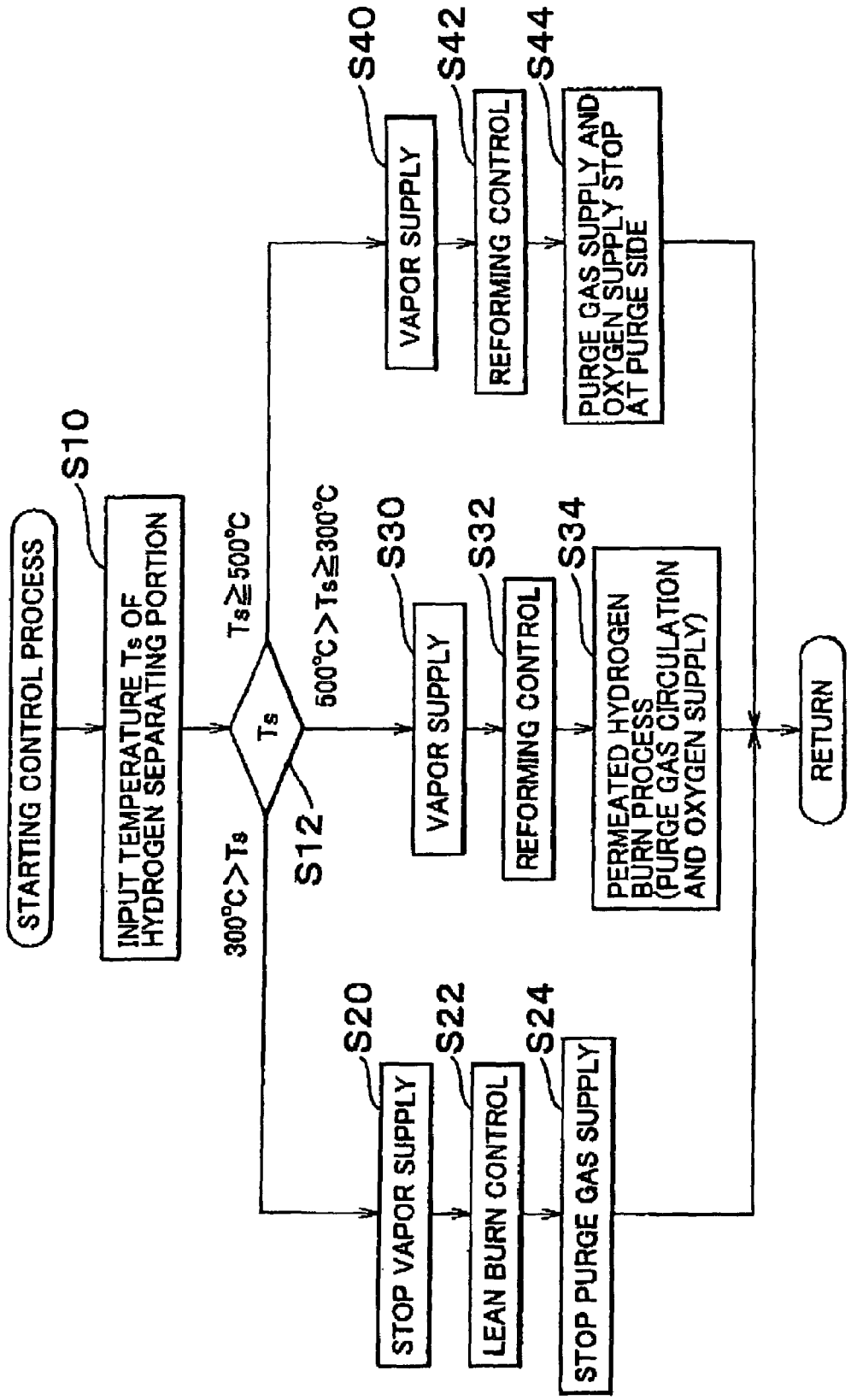
FIG. 2 is a flow chart showing a starting control process.

FIG. 2 shows a flow chart for a starting control process. The flow chart indicates a process executed repeatedly by the control unit 10 based on the operation for starting the fuel cell system. When the process is initiated, a temperature Ts of the hydrogen separating portion 60 is input to the control unit 10 via the temperature sensor 64 (Step S10). The process for starting is divided into three phases in accordance with the temperature Ts.

A first phase is a process in a low temperature condition of "Ts<300° C.".

A second phase is a process in a condition of "300° C.≦Ts<500° C.".

A third phase is a process in the condition of "500° C.≦Ts".

The threshold temperatures 300° C. and 500° C. for each phase are determined based on the following criteria.

The first threshold temperature 300° C. is determined based on the temperature at which hydrogen embrittlement of the hydrogen separator membrane 62 can be avoided. The hydrogen separator membrane 62 absorbs hydrogen when it comes into contact with the hydrogen in the low temperature condition, thereby causing hydrogen embrittlement. Considering such a characteristic, the fist threshold temperature may be set to a value a little higher than the lower limit value at which the hydrogen embrittlement can be avoided even when the hydrogen contacts the membrane 62. In this embodiment, the first threshold temperature is set to 300° C., assuming the case where a thin palladium film is used for the hydrogen separator membrane 62. However, the first threshold temperature can be set as appropriate based on the material of the hydrogen separator membrane 62.

The second threshold temperature 500° C. is determined based on the operation temperature of the hydrogen separating portion 60. Although the second threshold temperature in this embodiment is set to 500° C., the temperature can be set as appropriate based on the material of the hydrogen separator membrane 62.

When the temperature Ts of the hydrogen separating portion is lower than 300° C. (Step S12), the control unit 10 executes the starting control process in the first phase. This process executes the warm-up operation while avoiding the contact of the hydrogen separator membrane 62 with hydrogen.

According to the starting control process in the first phase, the control unit 10 controls the operation of the vaporizer 20 to stop the supply of vapor in order not to generate vapor reforming reaction (Step S20). Further, the control unit 10 controls the valves 31 and 32 to control the amounts of raw material and air supplied, in order to create a condition in which a ratio of the oxygen to the raw material is higher than a value appropriate for generating hydrogen (hereinafter called as "lean burn operation") (Step S22). At the same time, the control unit 10 stops the supply of purge gas so as to facilitate the warm-up operation (Step S24).

The lean burn operation refers to catalytic combustion of the raw material carried out in a condition where the ratio of the supplied air is higher than a stoichiometric air-fuel ratio. In his condition, the hydrogen is hardly generated, and accordingly the hydrogen embrittlement of the hydrogen separator membrane 62 can be avoided. In this embodiment, air approximately four times greater than the stoichiometric air-fuel ratio (hereinafter the amount of air in this ratio may be called as the stoichiometric amount) is supplied. By introducing a large amount of air as mentioned above, the combustion mature can be controlled to the operation temperature of the reformer 40, that is, approximately 800° C. Overheating of the reformer 40 can be avoided by controlling the combustion temperature, and accordingly deterioration of catalyst and generation of thermal stress can be suppressed. Further, due to the excessive supply of air, high temperature oxygen is supplied to the hydrogen separating portion 60. Thus, the deposited carbon attached to the surface of the hydrogen separator membrane 62 can be oxidized to purify the hydrogen separator membrane 62.

In the starting control process in the second phase, the temperature of the hydrogen separator membrane 62 has reached the temperature at which the hydrogen embrittlement does not occur. Thus, the control unit 10 starts to supply vapor to the reformer 40 (Step S30) to execute a reforming control (Step S32). At this moment, the lean burn operation is stopped and the rich burn operation is conducted, that is, the air is supplied by the amount appropriate for the partial oxidation reaction. Meanwhile, in this second phase, the warming up operation has not yet been completed, and therefore it is necessary to further facilitate the warming up operation. For this purpose, the control unit 10 executes a process for burning the hydrogen that has permeated through the hydrogen separator membrane 62 (Step S34). In other words, the pump 74 is driven to circulate the purge gas and the pump 65 is driven to supply air in order to oxidize the hydrogen permeated through the membrane 62. The oxidation reaction is facilitated by the oxidation catalyst carried on the heat exchanger 75. The heat generated by the oxidation reaction facilitates the warm-up operations of hydrogen separating portion 60, the heat exchanger 75, and the fuel cell 70. The amount of oxygen to be supplied can be set as appropriate in consideration of a facilitation effect of the warm-up operation. In this embodiment, the amount of oxygen supplied is set to a value about three times the theoretical value with which the hydrogen can be burned completely. A sudden rise in the temperature of the hydrogen separating portion 60 can be suppressed by supplying an excessive amount of oxygen, and thus damages on the hydrogen separator membrane 62 due to thermal stress can be avoided. In this embodiment, the hydrogen oxidation is carried out in the heat exchanger 75, however, it may be carried out in any portion within the circulation passage for purge gas.

In the starting control process in the third phase, the warm-up operation is almost completed. Therefore, the control unit 10 starts the same operation as the normal operation. That is, the vapor is supplied (Step S40) to execute the reforming control (Step S42), and at the same time the purge gas is supplied (Step S44). In this third phase, the pump 74 is driven to circulate the purge gas as in the case with the second phase control, but the operation of the pump 65 is suspended so as to stop the supply of air. As a result, the consumption of permeated hydrogen can be prevented, and the hydrogen can be utilized for generating electric power by the fuel cell 70.

Figure 3:
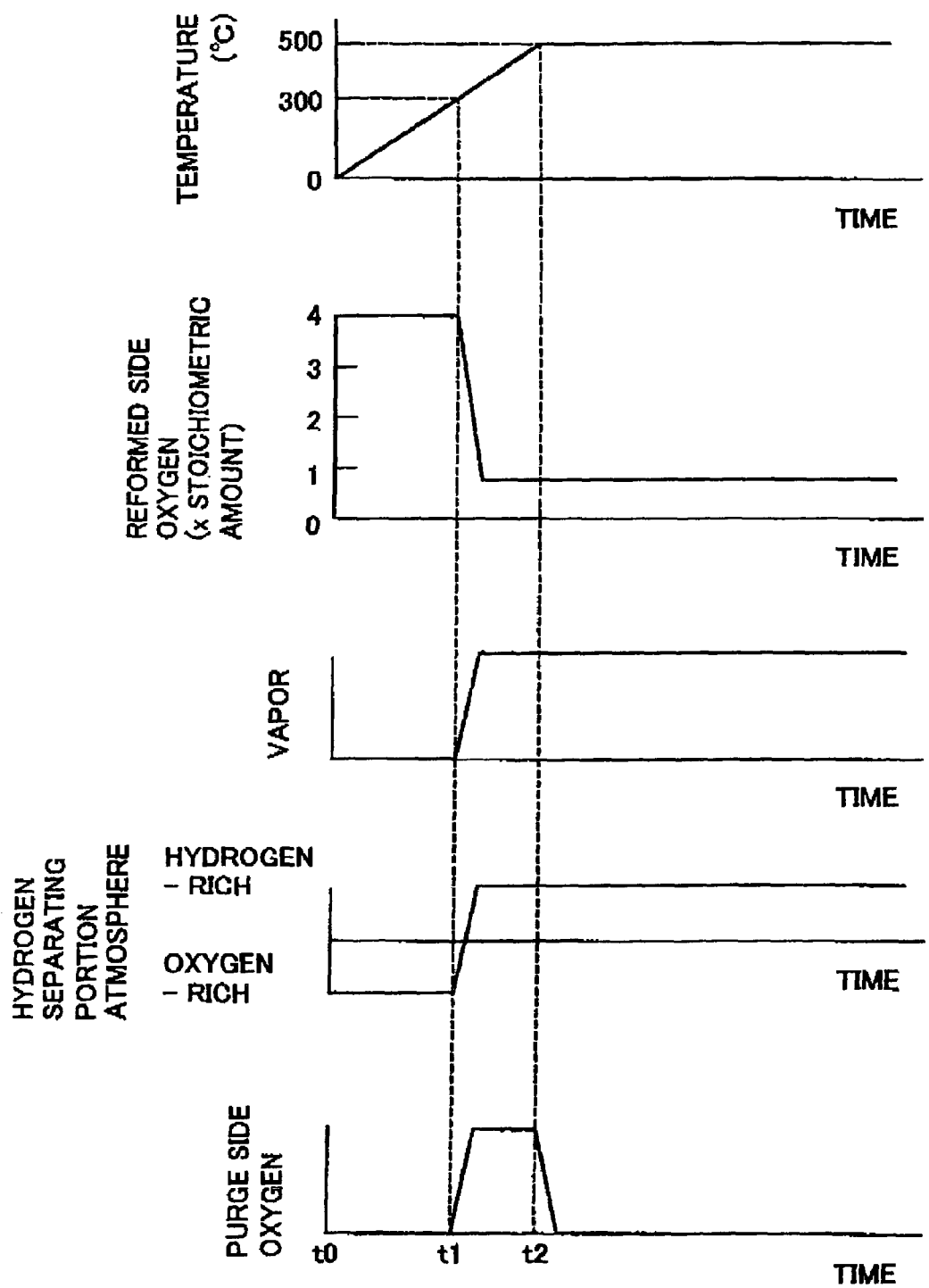
FIG. 3 is an explanatory view of a sequence of an amount of oxygen and the like in the starting control process.

FIG. 3 shows a sequence of the amount of oxygen and the like for the starting control process. A change in the phase of the staring control according to the temperature of the hydrogen separating portion 60 is schematically illustrated. Here, only the linear temperature rise of the hydrogen separating portion 60 is shown for the explanatory convenience.

As explained above, the staring control process in the first phase is carried out until the temperature of the hydrogen separating portion 60 reaches 300° C., that is, during a period between time t0 and t1. Accordingly, the amount of oxygen in the reforming side, or amount of oxygen supplied to the reformer 40 becomes about four times greater than the stoichiometric amount. Meanwhile, the supply of vapor to the reformer 40 and the supply of purge gas are stopped. As a result of the supply of a large amount of oxygen to the reformer 40, the hydrogen separating portion 60 is maintained in an oxygen-rich atmosphere.

While the temperature of the hydrogen separating portion 60 is between 300° C. and 500° C., that is, during a period between time t1 and t2, the starting control process in the second phase is carried out. Accordingly, the amount of oxygen supplied to the reforming side is reduced to the amount appropriate for the partial oxidation reaction. At the same time, the vapor supply to the reformer 40 is initiated. Accordingly, the hydrogen is generated in the reformer 40, thereby creating a hydrogen-rich atmosphere in the hydrogen separating portion 60. In the second phase, since the hydrogen permeated through the hydrogen separator membrane 62 is burned, oxygen for hydrogen burning is supplied to the circulation passage for purge gas.

After the temperature of the hydrogen separating portion 60 reached 500° C., that is, after the time t2, the starting control process in the third phase is carried out. In this process, the amounts of oxygen and hydrogen supplied to the reformer 40 are equal to those in the second phase. The hydrogen separating portion 60 is maintained in the hydrogen-rich atmosphere. In the third phase, since the warm-up operation of the hydrogen separating portion 60 is not necessary, the supply of oxygen to the circulation passage for purge gas is stopped. Thus, the operation mode of the hydrogen generating device is shifted to the normal operation.

As described above, the hydrogen suppressing portion suppresses the hydrogen concentration in the gas supplied to the reformed gas flow passage in the low temperature condition where the temperature of the hydrogen separating portion is lower than a predetermined temperature which is determined based on the material of the hydrogen separator membrane. The predetermined temperature can be set based on the lower limit value at which the hydrogen can be permeated through the hydrogen separator membrane without causing hydrogen embrittlement.

According to the hydrogen generating device in the first embodiment as explained above, generation of hydrogen can be suppressed by carrying out the lean bus operation in the reformer 40 in the low temperature condition. And the hydrogen embrittlement of the hydrogen separator membrane 62 can be avoided.

A3. Modified Example of the First Embodiment

Figure 4:
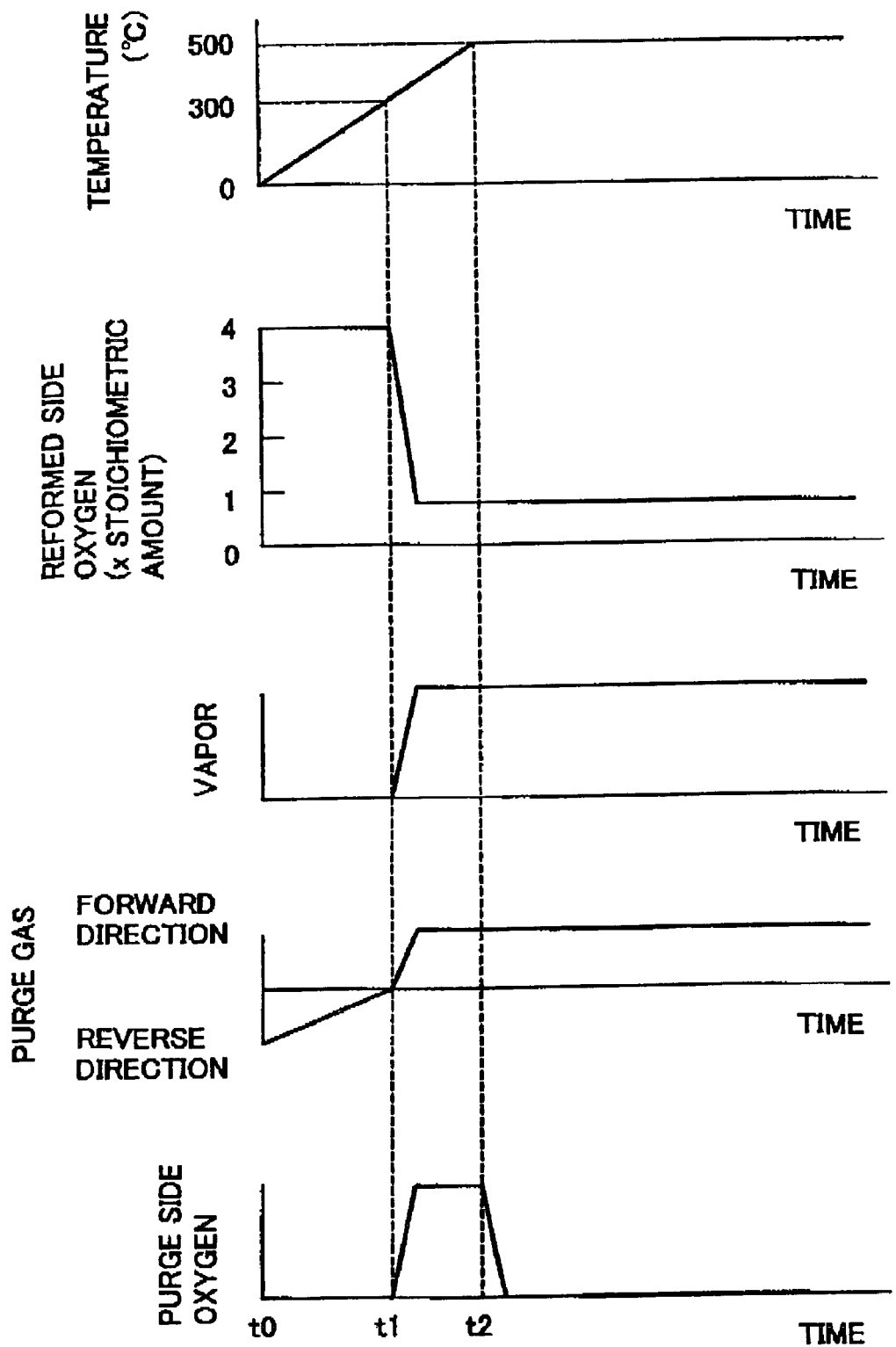
FIG. 4 is an explanatory view of a sequence of the staring control process as a modified example.

FIG. 4 shows a sequence of the starting control process as a modified example. In accordance with the same flow chart as in the first embodiment (FIG. 2), the control unit 10 executes the starting control process in three phases. In this modified example, only the process in the first phase is different from that in the first embodiment. For the explanatory purpose, the atmosphere in the hydrogen separating portion 60 is omitted in FIG. 4, but a change in the atmosphere is the same as that in the first embodiment.

In the first embodiment, the supply of purge gas is stopped in the first phase. However, in this example, the purge gas is supplied in a direction opposite to that during the normal operation. This can be achieved, for example, by driving the pump 74 in a reverse direction. Separately from the pump 74, another pump for supplying the purge gas in the revere direction may be provided. As explained with reference to FIG. 1, in the first embodiment, the hydrogen separating portion 60 is structured such that the reformed gas and the purge gas flow in the opposite direction from each other during the normal operation. Therefore, in this modified example, the reformed gas and the purge gas flow in the same direction at the time of starting. In the first phase, however, the oxygen is not supplied to the purge gas. In other words, the operation of the pump 65 is stopped.

According to the control process in the modified example, a high temperature reformed gas and a relatively low temperature purge gas can flow in the same direction with the hydrogen separator membrane 62 sandwiched therebetween, thereby enabling the temperature of the hydrogen separator membrane 62 to be uniformly increased. Accordingly, damages on the hydrogen separator membrane 62 due to thermal stress can be suppressed.

In the first phase, the flow rate of the purge gas flowing in the reverse direction may be made constant. In the modified example, however, the flow rate is adjusted in accordance with the temperature of the hydrogen separating portion 60. As shown in the drawing, the flow rate of the purge gas is suppressed in accordance with the increase in the temperature of hydrogen separating portion 60. As a result, a more uniform temperature rise of the hydrogen separator membrane 62 can be achieved. The relation between the purge gas flow rate and the temperature can be variably set either in linear or non-linear relationship.

The first embodiment illustrates the case where the supply of the purge gas is stopped, while the modified example shows the case where the purge gas is supplied in the reverse direction. Both may be selectively used, as appropriate. For example, the first phase can be further divided into two phases, one for stopping the purge gas supply and the other for supplying the purge gas in the reverse direction, according to the temperature of the hydrogen separator membrane 6.

B. Second Embodiment

B1. System Structure

Figure 5:
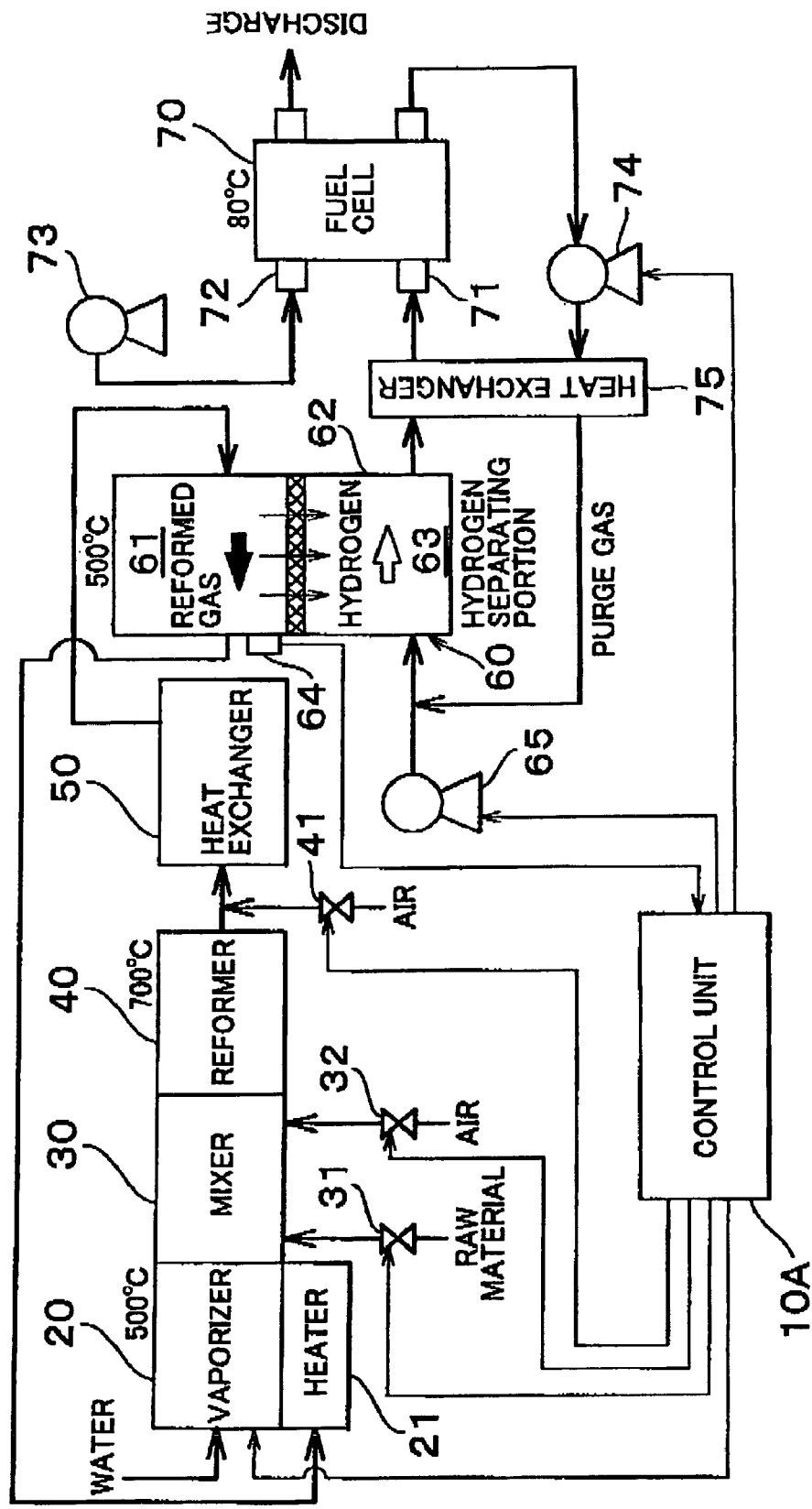
FIG. 5 is an explanatory view of a general structure of a fuel cell system according to a second embodiment.

FIG. 5 shows an explanatory view of a general structure of a fuel cell system according to a second embodiment. The structure is almost the same as that in the first embodiment, except that the air can be supplied between the reformer 40 and the hydrogen separating portion 60. The amount of air supply is controlled by the control unit 10A by adjusting the opening degree of a valve 41. This embodiment illustrates a case in which the air is supplied between the reformer 40 and the heat exchanger 50. However, the structure may be such that the air may be supplied between the heat exchanger 50 and the hydrogen separating portion 60.

B2. Starting Control Process

Figure 6:
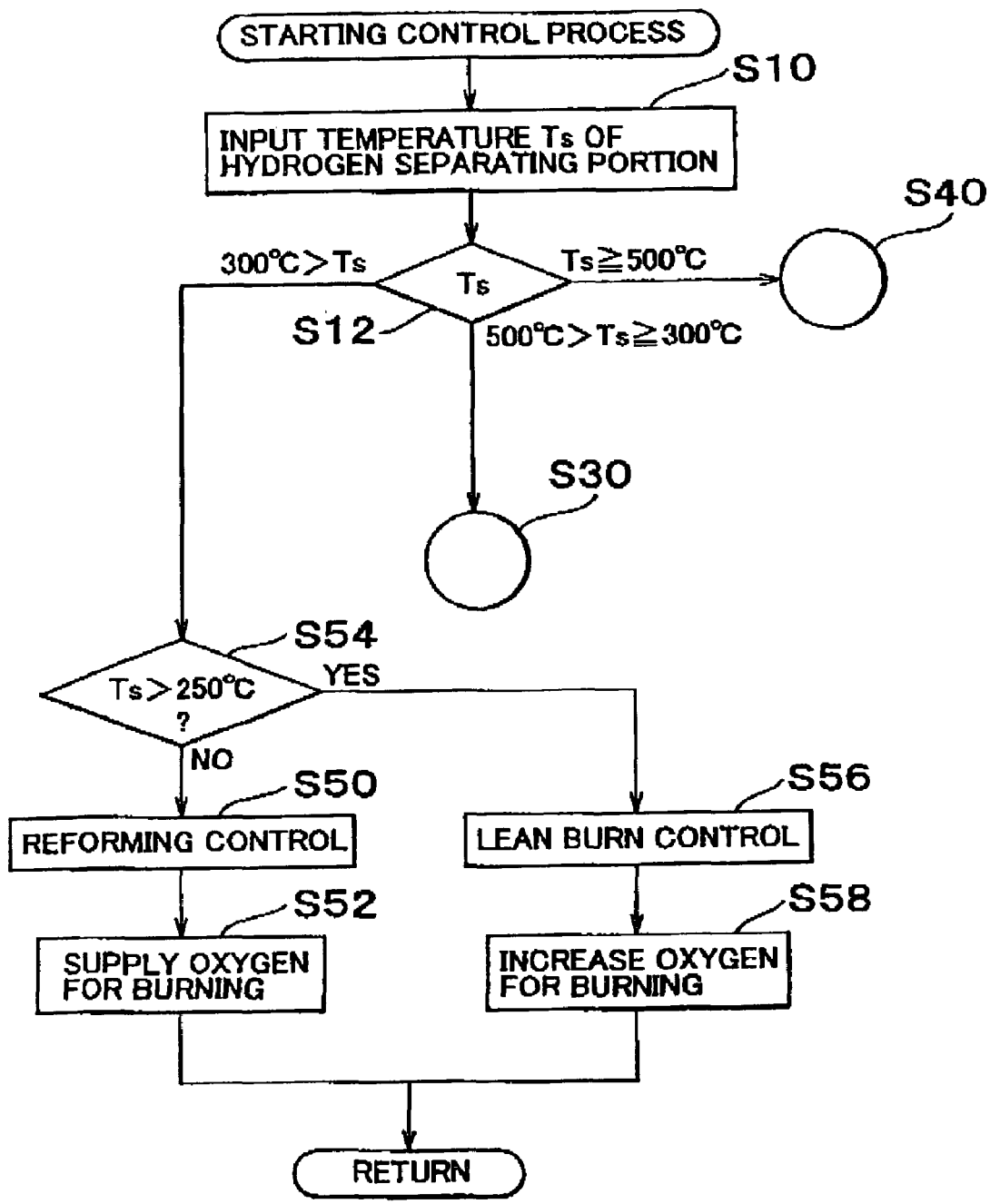
FIG. 6 is a flow chart showing a starting control process according to the second embodiment.

FIG. 6 shows a flow chart for a starting control process according to the second embodiment. As is the case with the first embodiment, the threshold temperatures are set to 300° C. and 500° C., and the control is executed in three phases. In the second embodiment, the process in the first phase is different from that in the first embodiment.

In the second embodiment, the process in the first phase is further divided into two phases in accordance with the temperature Ts of the hydrogen separating portion 60. When the temperature Ts is 250° C. or lower (Step S54), the control unit 10A executes the reforming control (Step S50). In other words, vapor, oxygen, and raw material as supplied to the reformer 40 to cause vapor reforming and partial oxidation reaction. The reformed gas thus generated includes not a little hydrogen.

The control unit 10A also supplies oxygen for burning (Step S52). That is the air is mixed into the reformed gas by increasing the opening degree of the valve 41. The hydrogen in the reformed gas is burned in the hydrogen separating portion 60 or an upstream thereof by the oxygen in the air. Accordingly, the contact between the hydrogen separator membrane 62 and the hydrogen is suppressed. Further, the heat generated by burning facilitates the warm-up operation of the hydrogen separating portion 60.

On the other hand, when the temperature Ts exceeds 250° C., a shifting control to the second phase is executed. In this embodiment, the control is changed to lean burn operation (Step S56) and the opening degree of the valve 41 is increased to increase the amount of oxygen supply (Step S58). The lean burn operation is carried out in the same manner as in the first phase according to the first embodiment. During the lean burn operation, the supply of vapor may be continued or may be stopped. The oxygen-rich atmosphere is crated in the hydrogen separating portion 60. Accordingly, the carbon deposited on the hydrogen separator membrane 62 can be purified by a large amount of high temperature oxygen.

The threshold temperature 250° C. for the shifting control can be set as appropriate in consideration of a time required for purifying the deposited carbon. In the second embodiment, lean burn operation (Step S56) and increasing of oxygen (Step S58) are both carried out, but only one of them may be used as long as the oxygen required for purifying the deposited carbon can be supplied.

Figure 7:
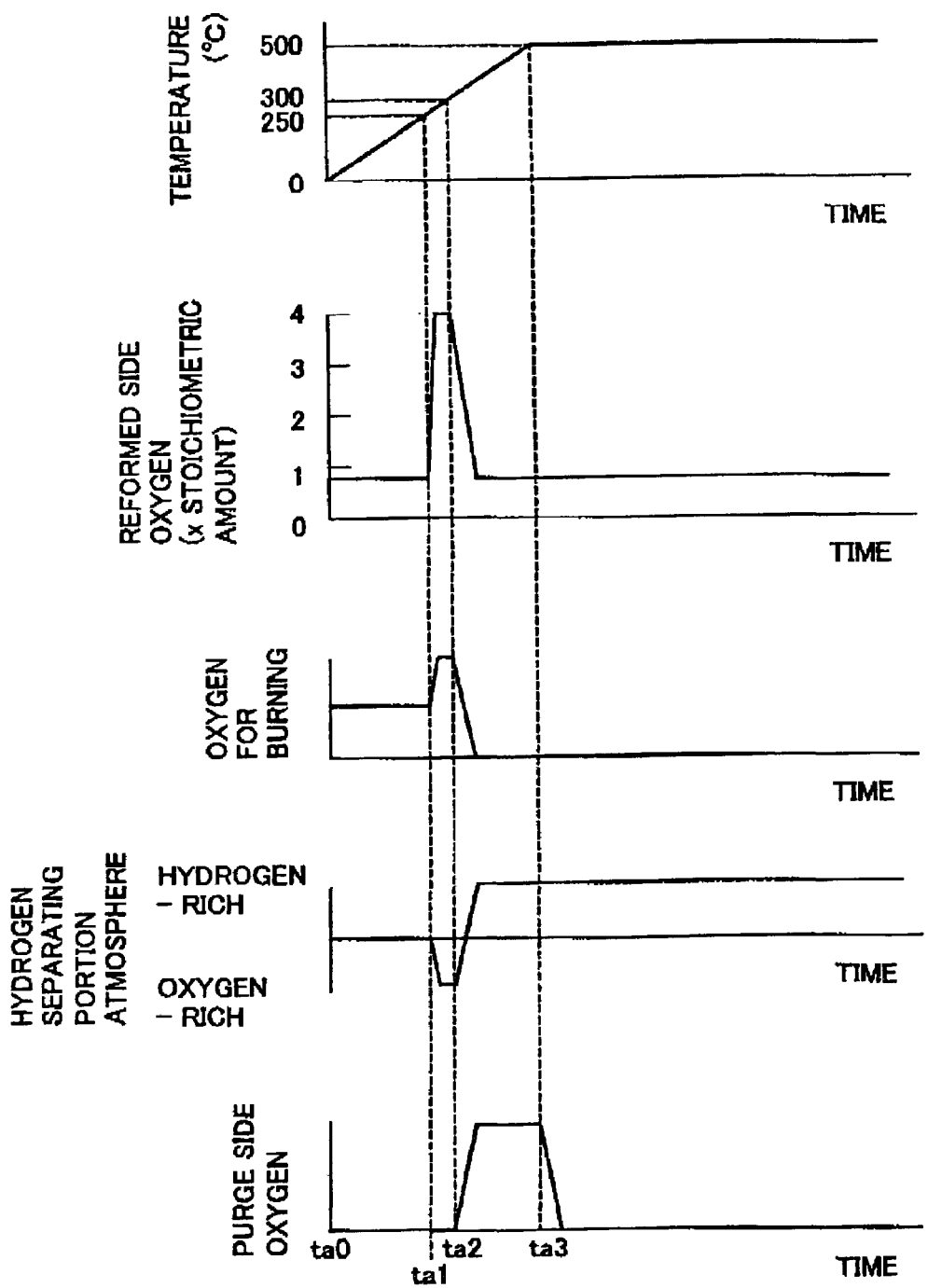
FIG. 7 is an explanatory view of a sequence of the starting control process according to the second embodiment.

FIG. 7 shows a sequence of the starting control process according to the second embodiment. As mentioned above, the starting process in the first phase is carried out until the temperature reaches 250° C., that is, during the period between the time ta0 and ta1. Therefore, the amount of oxygen in the reforming side or that is supplied to the reformer 40 becomes the amount suitable for partial reforming. Meanwhile, the oxygen for burning the hydrogen in the reformed gas is supplied to the upstream side of the hydrogen separating portion 60. Although hydrogen is generated in the reformer 40, it is burned before reaching the hydrogen separating portion 60, thus not creating a hydrogen-rich atmosphere therein. At the same time, an excessive amount of oxygen is not supplied to the hydrogen separating portion 60 either, and therefore an oxygen-rich atmosphere is not created. However, during this stage, the oxygen-rich atmosphere may be created in the hydrogen separating portion 60 by supplying an excessive amount of the oxygen for burning.

During a period in which the temperature is between 250° C. and 300° C., that is, a period between time ta1 and ta2, a shifting control from the first phase to the second phase is executed. Accordingly, the lean burn operation is carried out in the reformer, in other words, the air about four times greater than the stoichiometric amount is supplied to the reformer. At the same time, the amount of oxygen supplied for burning is increased. As a result, the oxygen-rich atmosphere is created in the hydrogen separating portion 60 to purify the carbon on the hydrogen separator membrane 62.

During the period between ta1 and ta2, as is the case with the first embodiment, the supply of purge gas is stopped. However, the purge gas may be supplied in the reverse direction, as in the modified example described above.

During a period in which the temperature is between 300° C. and 500° C., that is, a period between ta2 and ta3, the starting process in the second phase is carried out. After the temperature has reached 500° C., that is, after the time ta3, the starting process in the third phase is carried out. These processes are the same as those in the first embodiment, and therefore their explanations are omitted.

According to the hydrogen generating device in the send embodiment mentioned above, hydrogen embrittlement of the hydrogen separator membrane 62 can be suppressed by burning hydrogen included in the reformed gas at the time of starting. Furthermore, the heat obtained by burning the hydrogen facilitates the warm-up operation of the hydrogen separator membrane 62.

In the second embodiment, the case in which air is introduced from outside as the oxygen for burning was explained. A gas discharged from the heater 21 may be used for the oxygen for burning. The concentration of oxygen in the gas discharged from the heater 21 is relatively low. Accordingly, by supplying such discharged gas, instant burning of the hydrogen in the reformed gas can be avoided, thereby suppressing a sudden rise in the temperature of the hydrogen separating portion 60.

C. Modified Example

In the embodiments, the reformed gas is supplied to the hydrogen separating portion 60 through the heat exchanger 50 at the time of starting. However, a bypass flow passage which bypasses the beat exchanger 50 may be provided between the reformer 40 and the hydrogen separating portion 60, such that the reformed gas flows in the bypass flow passage at the time of starting. By bypassing the heat exchanger 50, the heat of the reformed gas can be effectively transmitted to the hydrogen separating portion 60, thereby facilitating the warm-up operation. Instead of providing the bypass flow passage, the operation of the heat exchanger 50 may be stopped at the time of starting.

According to the embodiments, the process at the time of starting has been explained. However, the process according to the invention is applicable not only at the time of starting but also to a case where the hydrogen separator membrane 62 is in the low temperature condition in which hydrogen embrittlement may be caused. Also, in the embodiment, the processes in the first to third phases are carried out in order, but any one of the three phases may be omitted in accordance with the temperature of the hydrogen separator membrane 62.

In the embodiment, the temperature of the hydrogen separator membrane 62 is detected, and based on this, each phase of the control process is switched. However, such phase switching may be based on various parameters associated with the temperature of the hydrogen separator membrane 62. For example, the phase can be switched based on the time elapsed after the sag process is initiated.

As explained above, according to one aspect of the invention, the hydrogen suppressing portion may be struck such that it controls the supply portion so as to cause the oxidation reaction in the reforming portion in the low temperature condition. In a condition where a large amount of oxygen exists, the partial oxidation does not occur. The raw material will become carbon dioxide and vapor by complete oxidation or oxidation by burner and the like, that is, by burning. Therefore, according to this control, generation of hydrogen is suppressed and avoiding hydrogen embrittlement of the hydrogen separator membrane. Further, this reaction causes a high temperature gas to be generated. Accordingly, by delivering the gas through the hydrogen generating device, the warm-up operation thereof can be facilitated.

Furthermore, by supplying a large amount of oxygen to the reforming portion, the following effects can be obtained according to the amount of oxygen supplied. First, the carbon attached to the hydrogen separator membrane can be oxidized by the high temperature oxygen, and thus the hydrogen separator membrane can be purified. Secondly, by supplying excessive oxygen or air for the oxidation reaction, the heat generated during the reaction can be diluted. Accordingly, the temperature of the gas generated by the reaction can substantially be adjusted to the operation temperature of the reforming portion, and the deterioration of the catalyst due to overheating during the warm-up operation can be mitigated. In addition, a sudden rise in the temperature of the hydrogen generating device can be avoided, thereby reducing generation of thermal stress.

The amount of oxygen supply can be set as appropriate in consideration of desired effects among those mentioned above. For example, when the amount of oxygen supply is controlled as the amount of air supply, the air about four is greater than the stoichiometric air-fuel ratio, which is require in order to completely oxidize the raw material, may be supplied. Further, the ratio of oxygen atom to carbon atom in the raw material may be set to about 12 to 13.

According to a second aspect of the invention, the hydrogen suppressing portion may be structured so as to include an oxygen supply mechanism which is capable of supplying oxygen between the reforming portion and the hydrogen separating portion, and a control portion which controls the oxygen supply mechanism to supply oxygen in the low temperature condition. Based on this structure, hydrogen included in the reformed gas can be burned by oxygen supplied from the oxygen supply mechanism, and the contact between the hydrogen separator membrane and hydrogen can be suppressed. Further, burning hydrogen in the hydrogen separating portion can also facilitate the warm-up operation. In the second aspect of the invention, it is preferable to generate hydrogen by partial oxidation in the reforming portion.

In the second aspect of the invention, it is preferable to create an oxygen-rich atmosphere in the reformed gas flow passage before hydrogen separation is carried out. This will enable the carbon deposited on the hydrogen separator membrane to be purified. Furthermore, by supplying excessive oxygen, a sudden rise in the temperature of the hydrogen separator membrane can be suppressed, thereby reducing the thermal stress. The oxygen-rich atmosphere can be created, for example, simply by increasing the amount of oxygen supplied at least from one of the supply portion and the oxygen supply mechanism. The amount of oxygen can be set as appropriate in accordance with the system structure. For example, when the amount of oxygen supply is controlled as the amount of air supply, the amount of the air may be three times greater than the theoretical value which is required in order to completely burn the hydrogen. The oxygen-rich atmosphere may also be achieved by carrying out the lean burn operation in the reforming portion.

The first and second embodiments described above can be used in combination as appropriate. For example, the starting control process as in the first embodiment and the starting process as in the second embodiment can selectively used in accordance with the temperature of the hydrogen separating portion 60.

According to the invention, regardless of the structure of the hydrogen suppressing portion, various additional structures can be adopted for facilitating the warm-up operation. For example, in the case where the purge gas supply portion for supplying the hydrogen flow passage of the hydrogen separating portion with the purge gas for discharging the separated hydrogen is provided, a control for stopping the supply of the purge gas in the low temperature condition can be adopted. The purge gas is supplied so that it delivers the separated hydrogen and reduces the hydrogen partial pressure in the hydrogen flow passage in order to improve the hydrogen separation efficiency. According to the invention, since the hydrogen permeation from the hydrogen separating portion is not performed in the low temperature condition, there is little need to supply the purge gas. To the contrary, when the purge gas is supplied, the heat of the hydrogen separator membrane is transferred outside, and thus the warm-up operation may be obstructed. Consequently, by stopping the supply of the purge gas in the low temperature condition, the warm-up operation can be facilitated without obstructing a function of the hydrogen separating portion.

On the other hand, in the case where the purge gas is supplied, it may be supplied in the low temperature condition in a direction opposite to that during the hydrogen permeation. When hydrogen is permeated, the purge gas is preferably supplied in a direction opposite to that of the reformed gas in order to improve the efficiency of hydrogen separation. When the supply portion to which the purge gas is supplied is structured as described above, a flow of the purge gas is reversed, that is, the purge gas flows in the same direction as that of the reformed gas in the low temperature condition. As a result, the temperature of the hydrogen separating portion can be increased uniformly, and thereby the thermal stress can be reduced.

When the reformed gas and the purge gas are supplied in the same direction as described above, it is also preferable to control their flow rate in accordance with the temperature of hydrogen separating portion. As a result of this, a further improvement can be achieved with respect to a homogeneous temperature distribution and a thermal stress reduction.

The purposes of stopping purge gas supply and supplying the purge gas in the reverse direction are different. Stopping the supply of purge gas aims to facilitate the warm-up operation of the hydrogen separating portion, while the supply in reverse direction aims to achieve the homogeneous temperature distribution. Therefore, these two operations may selectively used in accordance with the temperature condition of the hydrogen separating portion. For example, in the case of an extremely low temperature condition, the purge gas supply may be stopped to facilitate the warm-up operation, and when the temperature is increased to a certain degree, the purge gas may be supplied in the reverse direction.

For the purge gas, a gas that does not react with hydrogen is often used. For example, nitrogen or vapor may be used. Also, a gas discharged from the reformed gas flow passage of the hydrogen separating portion may be used for the purge gas.

According to the invention, when the heat exchanger is provided between the reforming portion and the hydrogen separating portion, a mechanism or a control for reducing calories taken from the reformed gas by the heat exchanger in the low temperature condition may be provided. For example, a bypass passage which bypasses the heat exchanger to supply the reformed gas can be provided, or a control for stopping the operation of the heat exchanger can be adopted. Based on these structures, the warm-up operation of the system can be facilitated.

In the hydrogen generating device according to the invention, it is preferable to stop the operation of the hydrogen suppressing potion when the temperature of the hydrogen separating portion reaches or exceeds a predetermined value. In the case where the hydrogen suppressing portion is in accordance with the first aspect of the invention, the lean bum operation is stopped at the predetermined temperature or higher, and therefore the partial reforming is initiated. At the same time, the vapor reforming may also be initiated. In the case where the hydrogen suppressing portion is in accordance with the second aspect of the invention, the supply of oxygen from the oxygen supply mechanism is stopped, and thus hydrogen generated in the reforming portion is supplied to the hydrogen separating portion. Since the hydrogen separating portion is kept at a temperature at which hydrogen embrittlement does not occur, the hydrogen supply and permeation may be initiated without any problem. Accordingly, the warm-up operation can further be facilitated by utilizing the permeated hydrogen.

For example, a structure may be such that a hydrogen reflow passage is provided for returning at least a part of the hydrogen generated to the hydrogen flow passage, and a burning portion for burning the hydrogen is provided in the hydrogen reflow passage. With this structure, the warm-up operation of the hydrogen separating portion can be facilitated by burning hydrogen. The hydrogen reflow passage can be commonly used with the supply passage for purge gas. For burning, hydrogen separated in the hydrogen separating portion may be used, or hydrogen that was not separated and remained in the non-permeated gas may be used. The burning portion may be structured in various ways. For example, if a heat exchanger is provided in the hydrogen reflow passage, the burning portion may be structured by providing the heat exchanger with an oxidation catalyst such as a platinum catalyst.

The invention is not limited to the aforementioned aspects related to the hydrogen generating device, and can be composed of various aspects including a starting method of the hydrogen generating device. For the hydrogen suppressing portion, the first and second aspects can appropriately be applied in combination or selectively. Other additional structures may also suitably be adopted in combination or by other means.

The invention is not limited to the embodiments described above and the improvements or modifications are possible within the scope and the spirit of the invention. For example, the control process described above may also be achieved not only by using a software but also a hardware.

What is claimed is:

1. A hydrogen generating device that generates a hydrogen-rich gas by reforming a raw material, comprising:
    a reforming portion that generates a reformed gas by reforming the raw material;
    a supply portion that supplies the reforming portion with a substance required for the reforming;
    a hydrogen separating portion that includes a hydrogen separator membrane that selectively permeates hydrogen, the hydrogen separating portion also including a reformed gas flow passage and a hydrogen flow passage, the hydrogen separator membrane is disposed between the reformed gas flow passage and the hydrogen flow passage, the hydrogen separating portion separates a hydrogen towards the hydrogen flow passage side from the reformed gas supplied to the reformed gas flow passage from the reforming portion;
    a temperature sensor that detects a temperature of the hydrogen separating portion; and
    a hydrogen suppressing portion that suppresses a hydrogen concentration in the reformed gas supplied to the reformed gas flow passage when, based on the temperature detected by the temperature sensor, it is determined that a low temperature condition exists in which a temperature of the hydrogen separating portion is lower than a predetermined value which is determined based on a material of the hydrogen separator membrane, wherein the hydrogen suppressing portion includes:
    an oxygen supply mechanism that is able to supply oxygen between the reforming portion and the hydrogen separating portion in the low temperature condition, and that is provided between the reforming portion and the hydrogen separating portion, and
    a control portion that controls the hydrogen suppressing portion so as to supply the oxygen.

2. The hydrogen generating device according to claim 1, wherein
    the supply portion supplies at least the raw material and oxygen to the reforming portion, and the hydrogen suppressing portion controls the supply portion so that a ratio of the oxygen to the raw material becomes greater than a value suitable for hydrogen generation when the hydrogen separating portion is in the low temperature condition.

3. The hydrogen generating device according to claim 1, further comprising:
    an oxygen enriching control portion that controls at least one of the supply portion and the oxygen supply mechanism so as to create an oxygen-rich atmosphere in the reformed gas flow passage before starting to separate hydrogen in the hydrogen separating portion.

4. The hydrogen generating device according to claim 1, further comprising:
    a purge gas supplying portion that supplies a purge gas to the hydrogen flow passage of the hydrogen separating portion so as to discharge the separated hydrogen, and
    the control portion controls the purge gas supplying portion so as to stop supplying of the purge gas in the low temperature condition.

5. The hydrogen generating device according to claim 1, further comprising:

a purge gas supplying portion that supplies a purge gas to the hydrogen flow passage of the hydrogen separating portion so as to discharge the separated hydrogen, and the control portion controls the purge gas supplying portion to supply the purge gas in a direction opposite the direction of a flow of the reformed gas when hydrogen is separated and in the same direction as the direction of the flow of the reformed gas in the low temperature condition.

6. The hydrogen generating device according to claim 5, wherein the purge gas supplying portion controls a flow rate of the purge gas in accordance with a temperature of the hydrogen separating portion.

7. The hydrogen generating device according to claim 1, further comprising:

a heat exchanger provided between the reforming portion and the hydrogen separating portion; and a reducing portion that reduces a calorie taken from the reformed gas by the heat exchanger in the low temperature condition.

8. The hydrogen generating device according to claim 7, wherein the reducing portion is a bypass passage to deliver the reformed gas so as to bypass the heat exchanger.

9. The hydrogen generating device according to claim 1, wherein the hydrogen suppressing portion stops operating when the temperature of the hydrogen separating portion reaches or exceeds the predetermined value.

10. The hydrogen generating device according to claim 9, further comprising:

a hydrogen reflow passage that returns at least a part of the hydrogen that has exited the hydrogen flow passage back to the hydrogen flow passage of the hydrogen separating portion; and a burning portion disposed in the hydrogen reflow passage and that burns the hydrogen in the hydrogen reflow passage.

11. The hydrogen generating device according to claim 10, wherein the hydrogen reflow passage includes a heat exchanger, and the burning portion includes an oxidation catalyst disposed in the heat exchanger.

12. A hydrogen generating device that generates a hydrogen-rich gas by reforming a raw material, comprising:

a reforming portion that generates a reformed gas by reforming the raw material;

a supply portion that supplies the reforming portion with a substance required for the reforming;

a hydrogen separating portion that includes a hydrogen separator membrane that selectively permeates hydrogen, the hydrogen separating portion also including a reformed gas flow passage and a hydrogen flow passage, the hydrogen separator membrane is disposed between the reformed gas flow passage and the hydrogen flow passage, the hydrogen separating portion separates a hydrogen towards the hydrogen flow passage side from the reformed gas supplied to the reformed gas flow passage from the reforming portion;

means for determining whether a temperature of the hydrogen separating portion is lower than a predetermined value, a low temperature condition being determined to exist when the temperature of the hydrogen separating portion is determined to be lower than the predetermined value; and a hydrogen suppressing portion that suppresses a hydrogen concentration in the reformed gas supplied to the reformed gas flow passage when it is determined that the low temperature condition exists, wherein the hydrogen suppressing portion includes:

an oxygen supply mechanism that is able to supply oxygen between the reforming portion and the hydrogen separating portion in the low temperature condition, and that is provided between the reforming portion and the hydrogen separating portion, and a control portion that controls the hydrogen suppressing portion so as to supply the oxygen.

13. The hydrogen generating device according to claim 12, wherein the means for determining whether the temperature of the hydrogen separating portion is lower than the predetermined value includes a temperature sensor that detects the temperature of the hydrogen separating portion.

14. The hydrogen generating device according to claim 12, wherein the means for determining whether the temperature of the hydrogen separating portion is lower than the predetermined value determines the temperature of the hydrogen separating portion based on a time amount that has elapsed since starting of the hydrogen generating device.

* * * * *